Aug. 11, 1931.  H. J. ENGBRECHT  1,818,124
DRAIN PIPE DEVICE
Original Filed May 25, 1925
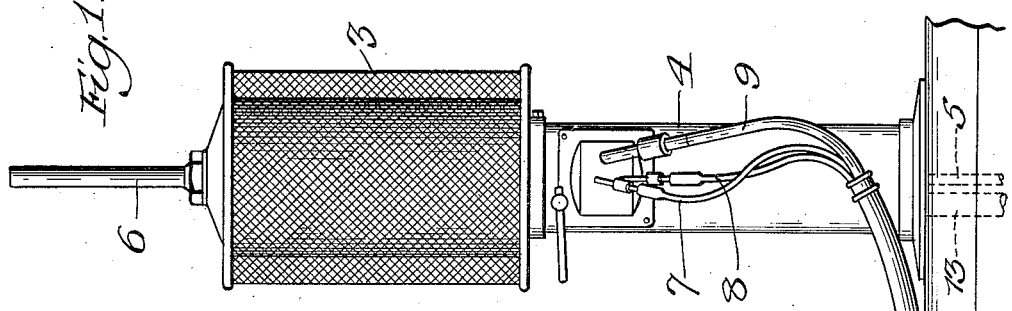
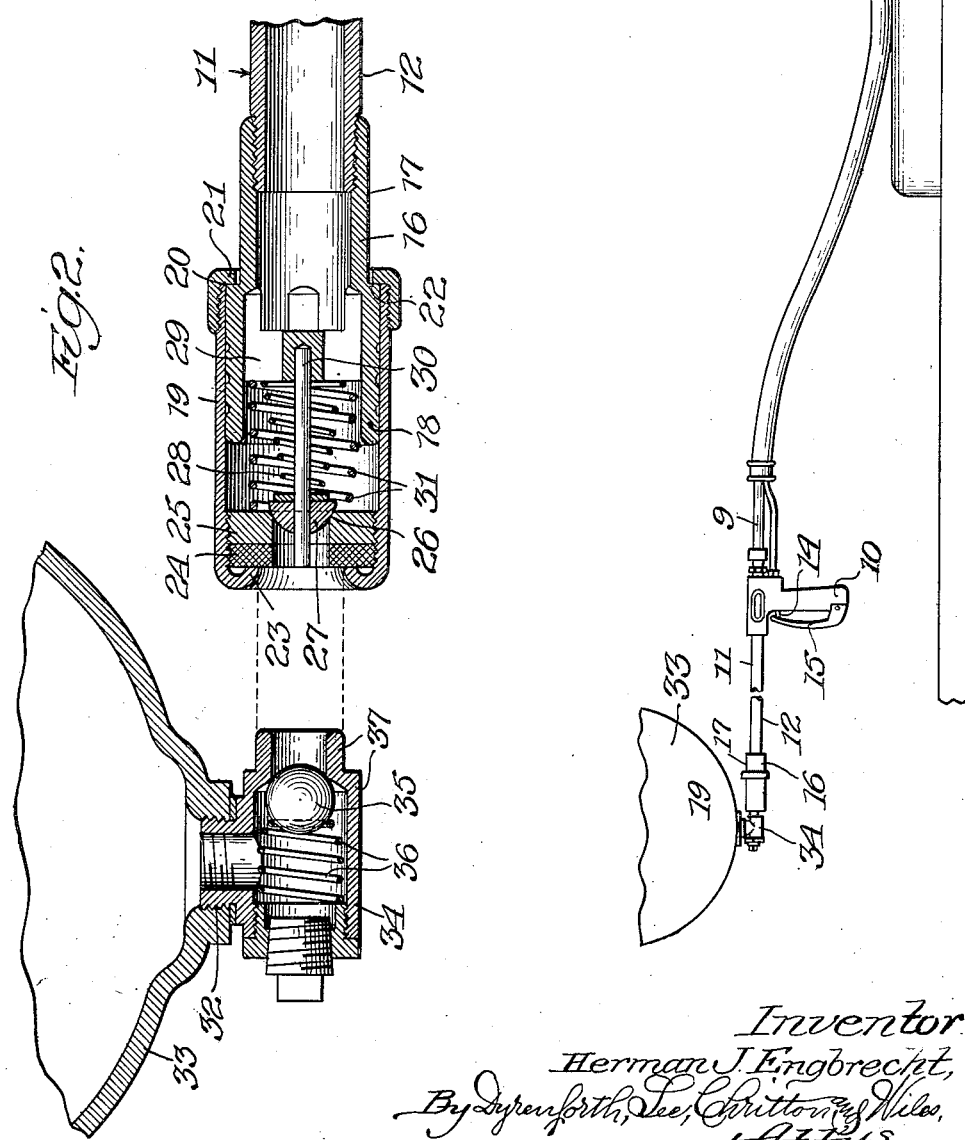
Inventor
Herman J. Engbrecht,
By Dyrenforth, Lee, Chritton & Wiles,
Attys Patented Aug. 11, 1931

1,818,124

UNITED STATES PATENT OFFICE

HERMAN J. ENGBRECHT, OF CHICAGO, ILLINOIS, ASSIGNOR TO STANDARD OIL COMPANY, OF WHITING, INDIANA, A CORPORATION OF INDIANA

DRAIN PIPE DEVICE

Original application filed May 25, 1925, Serial No. 32,745. Divided and this application filed November 6, 1926. Serial No. 146,767.

My invention relates, more particularly, to means for evacuating receptacles of their contents and more especially to the evacuating of oil receptacles, as for example and more particularly crank cases of automobile engines, as a preliminary to the recharging of the receptacle with fresh oil. My present invention relates more especially to means for establishing the desired connection between the pipe through which the contents of the receptacle is to be discharged, and the outlet of the receptacle, the present application being a division of my pending application for U. S. patent Ser. No. 32,745 filed May 25, 1925, and, as to certain features thereof, a continuation of my pending application for U. S. patent Ser. No. 13,819 filed March 7, 1925.

My objects are to provide novel, simple and positively operating means for the purpose stated which shall be of special utility in connection with an extension pipe device for the flow of the oil from the lower, valve-equipped, drain outlet of an automobile crank case to a discharge point, under the control of a power device for exerting a drawing action on the contents of the crank case; to provide against the draining of the oil from the inlet end of the pipe device following the disconnecting of the latter from the drain outlet; and other objects as will be manifest from the following description:

I have devised my invention for embodiment, more particularly, in an apparatus of the type shown in my pending applications involving, in general, the use of an extension pipe device of a character adapting it to be applied at its inlet end, by the operator grasping the pipe adjacent a side of the automobile, to the valved drain outlet of the crank case of the automobile for communication therewith, the pipe device having a valve for controlling the flow of fluid pressure, as for example compressed air, to an ejector device positioned to exert suction in a receptacle for receiving the used oil and in turn exert suction in the pipe device to act upon the oil in the crank case and effect the desired flow therefrom into the receptacle referred to, and have therefore illustrated it in such an apparatus, in the accompanying drawings, a description of which is as follows:

Figure 1 is a view in side elevation of such an apparatus, embodying my improvements, showing the apparatus in conjunction with the crank case of an automobile the oil in which is to be removed; and Figure 2, an enlarged view in sectional elevation of the outlet portion of the crank case and that end of the extension pipe device which directly cooperates therewith, the pipe device being shown disconnected from the outlet of the crank case, but in alignment therewith.

In explanation of the illustrated apparatus of which my improved pipe device is a part, it may be stated that 3 represents a receptacle for receiving the oil discharged from the crank case to be evacuated, this receptacle, which is preferably of glass to render the contents thereof visible, being mounted upon a standard 4. The apparatus also comprises an ejector device (not shown) operated by compressed air supplied through a pipe 5 from any suitable source, to the ejector the discharge from which passes out through a pipe 6 extending upwardly from the receptacle, the ejector referred to and which is located at the base of the pipe 6 and therefore at the upper end of the receptacle 3, operating to produce suction in this receptacle. The apparatus also comprises flexible hose lines 7, 8 and 9, which connect with, and open into, the handle-equipped head 10 of a rigid extension pipe device represented generally at 11, the head 10 being connected with one end of a rigid pipe 12 opening into one end of a passage (not shown) in the head 10 which communicates with the pipe 9, the latter communicating with the interior of the receptacle 3 adjacent the upper end thereof. The arrangement of these parts is such that the suction produced in the receptacle 3 operates to exert suction in the pipe 9, head 10, and pipe 12, to draw the oil from the crank case to which the extension pipe device is applied, and discharge it into the receptacle 3 from which latter it flows, under the control of the operator, through a pipe 13 equipped with a hand-controlled valve (not shown), to any suitable point of discharge.

In the arrangement shown the pipe 5 does not lead directly to the ejector device referred to, but opens into the pipe 8, the pipe 8, as also the pipe 7, opening into the head 10. The head 10 is provided with valve mechanism (not shown except for the stem portion thereof represented at 14) which controls the flow of air from the pipe 8 to the pipe 7. The valve mechanism referred to is controlled by a lever 15 fulcrumed on the head 10 and co-acting with the stem 14 of the valve, whereby the operator while grasping the extension pipe device 11 may control the operation of the ejector device referred to.

The extension pipe device 11 is provided at its outer end with a fitting represented generally at 16 constructed in accordance with my invention and provided for engaging the pipe device with the adapter-equipped outlet of a crank case, the fitting 16 comprising a tubular member 17 into which the outer end of the pipe 12 is screwed, the outer end of the member 17 being expanded as represented at 18. Surrounding the expanded portion 18 of the member 17 is a sleeve 19 provided at one end with a collar 20 presenting a flange 21 overlapping a shoulder 22 on the member 18 and limiting outward movement of the sleeve 19, the opposite end of the sleeve having an inturned flange 23. Screwed into the sleeve 19, with a gasket 24 interposed between it and the flange 23, is a ring 25 presenting a valve seat 26 for a valve 27 backed by a coil spring 28 confined between it and a spider 29 rigid with the member 18 and holding the valve 27 to its seat. The spider 29 carries a pin 30 which extends through the spring 28 and loosely through the valve 27 to a position closely adjacent the outer end of the sleeve 19. The sleeve 19 is yieldingly held in extended position shown in Fig. 2 by a coil spring 31 confined between the ring 25 and the spider 29.

The particular adapter shown and screwed into the usual drain outlet 32 of the crank case shown at 33, is represented at 34, it being provided with an outwardly seating valve 35 shown as in the form of a ball with a spring cooperating therewith for seating it, shown at 36. The outer end of the adapter, and represented at 37, is of a size to be received by the opening in the outer end of the sleeve 19 and in the application of the fitting 16 to the adapter 34, the gasket 24 engages the outer end portion 37 of the adapter and upon pushing the extension pipe device toward the adapter the sleeve 19 is held stationary by the adapter and the pin 30 is forced against the valve 35 and unseats it, the member 17 sliding in the sleeve 19 in this operation.

Suction being exerted in the receptacle 3 by the action of the ejector device referred to, assuming that the operator has opened the valve in the head 10, and the extension pipe device having been applied to the adapter 34 as stated, the oil is sucked from the crank case into the receptacle 3, the valve 27, backed by the spring 28, which is relatively light, yielding readily in a direction away from the seat 26 and not offering substantial resistance to the flow of oil into the extension pipe device.

Upon removing the extension pipe device from the adapter 34 the valve 35 automatically closes to close the outlet of the adapter and the valve 27 also automatically closes to prevent spilling of oil from the extension pipe device 11.

The rigid extension pipe device 11 is preferably provided of such length that the operator grasping the handle-equipped head 10, while positioned adjacent a side of the automobile, may readily apply this extension pipe device to the outlet of the crank case.

While I have illustrated and described a particular construction embodying my invention I do not wish to be understood as intending to limit it thereto as various modifications and alterations may be made therein and my improvements used with apparatuses of other types than that in connection with which I have illustrated and described it, without departing from the spirit of my invention.

What I claim as new, and desire to secure by Letters Patent, is:

1. A pipe device comprising a pipe, a pin carried by, and movable with, said pipe, a sleeve surrounding, and slidable along, said pipe and having a seat portion, said sleeve being adapted to guidingly engage the outlet end of a valved discharge outlet and said seat portion to engage said outlet and make a joint therewith, whereby said pin, following the engagement of said seat portion with said outlet, moves inwardly with the pipe to open said valve, a spring for holding said sleeve in forwardly projecting position, and stop means comprising cooperating parts on said pipe and sleeve for limiting outward movement of said sleeve on said pipe under the action of said spring, said pin being spaced from said sleeve in the open condition of said valve.

2. A pipe device comprising a pipe, a sleeve slidable along said pipe and adapted to seat against the outlet end of a valved discharge outlet, a spring yieldingly resisting the sliding of said sleeve, a pin on, and movable with, said pipe and adapted to engage the valve of said outlet, an inwardly opening check valve in said sleeve and movable relative to said sleeve and through which said pin extends and relative to which said pin is movable, and a spring yieldingly holding said check valve in seated position.

3. A pipe device, comprising a pipe, a pin carried thereby, a member on said pipe having a seat portion adapted to engage the outlet end of a valved discharge outlet to make a joint therewith, said pin and member being relatively movable whereby said pin, following the engagement of said seat portion with said discharge outlet, moves inwardly with the pipe to open said valve, an inwardly opening check valve in said sleeve and movable relative to said sleeve and through which said pin extends and relative to which said pin is movable, and a spring yieldingly holding said check valve in seated position.

4. A pipe device comprising a pipe, a sleeve slidable along said pipe and having a seat portion adapted to engage the outlet end of a valved discharge outlet to make a joint therewith, a spring in said sleeve and yieldingly resisting the sliding of the latter, a pin on, and movable with, said pipe and located within said sleeve and positioned to engage the valve of said outlet, said sleeve having a seat in its interior surrounding said pin, a valve sliding on said pin and cooperating with said last-referred-to seat, and a spring yieldingly holding said last-named valve in seated position.

5. A pipe device comprising a pipe, a sleeve slidable along said pipe and adapted to seat against the outlet end of a valved discharge outlet, a spring yieldingly resisting the sliding of said sleeve, a pin on, and movable with, said pipe and adapted to engage the valve of said outlet, a check valve in said sleeve and operable to open condition by the flow of fluid into said pipe, and a spring yieldingly holding said check valve in seated position.

6. A pipe device comprising a pipe, a sleeve slidable along said pipe and adapted to seat against the outlet end of a valved discharge outlet, a spring yieldingly resisting the sliding of said sleeve, a pin on, and movable with, said pipe and adapted to engage the valve of said outlet, a check valve in said sleeve and through which said pin extends and relative to which said pin is movable, said check valve being operable to open position by the flow of fluid into said pipe, and a spring yieldingly holding said check valve in seated position.

7. A pipe device comprising a pipe, a cross member at the interior of said pipe, a pin carried by, and movable with, said cross member and thus with said pipe, and a sleeve surrounding, and slidable along, said pipe and having a seat portion, said sleeve being adapted to guidingly engage the outlet end of a valved discharge outlet and said seat portion to engage said outlet and make a joint therewith, whereby said pin, following the engagement of said seat portion with said outlet, moves inwardly with the pipe to open said valve.

8. A pipe device comprising a pipe, a sleeve slidable along said pipe and adapted to seat against the outlet end of a valved discharge outlet, a spring yieldingly resisting the sliding of said sleeve, a pin on, and movable with, said pipe and adapted to engage the valve of said outlet, said sleeve having an inwardly facing seat, an inwardly opening check valve in said sleeve and co-operating with said inwardly facing seat and through which said pin extends and relative to which said pin is movable, and a spring yieldingly holding said check valve in seated position.

HERMAN J. ENGBRECHT.